US005725656A

United States Patent [19]
Shimanovich et al.

[11] Patent Number: 5,725,656
[45] Date of Patent: Mar. 10, 1998

[54] GYPSUM COMPOSITION

[75] Inventors: Semyon Shimanovich, Brooklyn, N.Y.; Christian Meyer, Demarest, N.J.; Leon Cukrowski, Jackson Heights, N.Y.

[73] Assignee: The Trustees of Colombia University in the City of New York, New York, N.Y.

[21] Appl. No.: 654,704

[22] Filed: May 29, 1996

[51] Int. Cl.$^6$ .............................. C04B 11/00; C04B 28/14
[52] U.S. Cl. ..................... 106/778; 106/712; 106/772; 106/776; 106/781; 106/802; 524/6; 524/2; 524/423; 524/650
[58] Field of Search .................... 106/712, 772, 106/776, 778, 781, 802; 524/2, 6, 650, 423, 4

[56] References Cited

U.S. PATENT DOCUMENTS

| | | | |
|---|---|---|---|
| 3,869,415 | 3/1975 | Williams | 106/778 |
| 3,915,919 | 10/1975 | Nishioka et al. | 524/423 |
| 4,174,230 | 11/1979 | Hashimoto et al. | 524/4 |
| 4,804,688 | 2/1989 | Vassileff | 524/423 |
| 4,849,018 | 7/1989 | Babcock et al. | 524/2 |
| 5,075,358 | 12/1991 | Riley et al. | 106/778 |
| 5,336,318 | 8/1994 | Attard et al. | 106/778 |

*Primary Examiner*—Michael Marcheschi
*Attorney, Agent, or Firm*—Baker & Botts, LLP

[57] ABSTRACT

This invention relates generally to a gypsum composition having improved setting and strength characteristics. More specifically, this invention relates to a gypsum composition comprising an acrylic latex and an aliphatic alcohol wherein the composition has a retarded setting rate. This gypsum composition may further comprise a melamine-formaldehyde polymer and/or a styrene butadiene latex. This invention further relates to an artificial marble gypsum composition.

18 Claims, No Drawings

GYPSUM COMPOSITION

INTRODUCTION

This invention relates generally to a gypsum composition having improved setting and strength characteristics. More specifically, this invention relates to a gypsum composition comprising an acrylic latex and an aliphatic alcohol wherein the composition has a retarded setting rate. This invention further relates to an artificial marble gypsum composition.

BACKGROUND OF THE INVENTION

Conventional gypsum compositions are problematic because they have very rapid setting times. These rapid setting times are a disadvantage because they make it difficult to obtain level surfaces of gypsum over a large area. Specifically, the gypsum composition may harden before gravity causes the composition to flow sufficiently to create an even surface. Gypsum compositions are often used as building materials, and therefore it is desirable for them to have superior mechanical strength.

Attempts have been made to solve these problems by combining additives with gypsum to lengthen its setting time. Some of these attempts have successfully lengthened the setting time, but they have not improved the mechanical strength of the set material.

Therefore, a need clearly exists for a gypsum composition which has high mechanical strength. A need also exists for a gypsum composition having a retarded setting time and increased flowability sufficient to produce an even surface upon setting. A need further exists for a gypsum composition suitable for use as artificial marble. It would also be desirable for such an artificial marble composition to produce an even surface upon setting, thus eliminating the need for polishing.

SUMMARY OF THE INVENTION

The deficiencies of the prior art are substantially ameliorated in accordance with the present invention, which is in one aspect, a gypsum composition having a retarded setting time, increased flowability and increased strength. The gypsum composition according to the invention comprises gypsum, an acrylic latex and an aliphatic alcohol. Before setting, the gypsum composition further comprises an amount of water which is substantially absorbed during the setting process.

In an exemplary embodiment of the present invention, the acrylic latex is present in an amount of between 0.25 to 4%, and the aliphatic alcohol is present in an amount of between 0.1 to 1%, by weight of the gypsum.

In another exemplary embodiment of the present invention, the gypsum composition further comprises from 0.5 to 2% by weight of gypsum, of a melamine-formaldehyde polymer.

In a yet further exemplary embodiment of the present invention, the gypsum composition further comprises from 1.6 to 8% by weight of gypsum, of a styrene butadiene latex.

In another preferred embodiment of the present invention, the gypsum composition further comprises from 1.6 to 8% by weight of gypsum, of a styrene butadiene latex, and from 0.5 to 2% by weight of gypsum, of a melamine-formaldehyde polymer.

In an alternative exemplary embodiment of the present invention, the gypsum composition also contains a pigment which may be mixed with the composition to produce artificial marble upon setting.

Other features, aspects and advantages of the invention will become better understood with reference to the following description of the invention, the claims, and accompanying examples.

DETAILED DESCRIPTION OF THE PREFERRED EMBODIMENTS

The present invention provides a gypsum composition having a retarded setting rate and superior mechanical properties. The present invention also provides a gypsum composition suited for use as artificial marble.

The invention is based, in part, on the finding that when an acrylic latex and an aliphatic alcohol are both added to gypsum, the setting time and flowability increase, and the set product has superior strength over gypsum compositions lacking these ingredients. The invention is further based on the fact that these properties are further improved by adding a styrene butadiene latex and/or a melamine-formaldehyde polymer to the gypsum composition. Each of the following exemplary embodiments of the invention is a gypsum composition which comprises an acrylic latex and an aliphatic alcohol. Additional ingredients are also present where specified. The following exemplary embodiments are meant to illustrate the invention. However, the invention should not be limited to these exemplary embodiments.

In a first exemplary embodiment of the invention, the aliphatic alcohol is isopropyl alcohol. In a second exemplary embodiment of the invention, the aliphatic alcohol is a polyether derivative of an aliphatic alcohol. Examples of these polyether derivatives are sold under the tradenames "FOAMASTER A" and "AFRANIL F", which are commercially available from the Henkel and BASF corporations, respectively.

In a third exemplary embodiment of the invention, the acrylic latex has a molecular weight of more than 5,000. An example of a suitable acrylic latex for use in the invention is "DRYCRYL DP-2903," which is commercially available from the Rohm & Haas corporation.

In a fourth exemplary embodiment of the invention, the gypsum composition contains an acrylic latex, an aliphatic alcohol and a melamine-formaldehyde polymer, such as melamine formaldehyde sodium bisulfite. As shown by a comparison of Examples 3 and 5 or 1 and 4 in Table I, the addition of a melamine-formaldehyde polymer increases strength without compromising flowability or workability. Moreover, whereas a conventional gypsum composition requires a water-to-gypsum ratio of 0.7 for adequate workability, the gypsum composition according to the fourth exemplary embodiment of the invention permits us to reduce this water-to-gypsum ratio, which increases the strength of the set gypsum composition.

In a fifth exemplary embodiment of the invention, the gypsum composition contains an acrylic latex, an aliphatic alcohol and a styrene butadiene latex. As shown by a comparison of Examples 4 and 5 or 1 and 3 of Table I, the styrene butadiene latex helped increase both the setting time and the strength of the set gypsum composition.

In a sixth, preferred exemplary embodiment of the present invention, the gypsum composition contains an acrylic latex, an aliphatic alcohol, a melamine-formaldehyde polymer and a styrene butadiene latex. In a seventh, more preferred exemplary embodiment of the present invention, the additives are present in the following percentages by weight of the gypsum:

(a) Acrylic Latex—0.25 to 4%,
(b) Aliphatic Alcohol—0.1 to 1%, (c) Styrene Butadiene Latex—1.6 to 8%, and (d) Melamine-Formaldehyde Polymer—0.5 to 2%.

In an eighth exemplary embodiment of the present invention, the gypsum composition further contains a pigment. The amount of pigment used is dependent on the degree of coloring and pattern desired for artificial marble. Suitable pigments for use with the invention include organic or mineral pigments such as jet black or emerald green, which are commercially available from Landers & Segal Color Co., Inc.

The present invention is further described by way of the following examples. These examples are intended to be representative of the invention and are not in any way intended to limit its scope.

EXAMPLE 1

Preparation of Gypsum Compositions

Several gypsum compositions were prepared according to the invention and their mechanical properties were tested after seven days. The results of these experiments are summarized below in Table I.

based on ASTM C-230, which was modified for use with gypsum. The setting time was determined by the ASTM C-472 test method. The compressive, tensile and flexual strengths were determined using the ASTM C472, C348 and C307 testing procedure. These ASTM standards are incorporated herein by reference.

Samples 1, 2 and 2(i) were prepared according to the seventh exemplary embodiment of the invention, which comprises all four additives. Table I shows that samples 1, 2 and 2(i) exhibited retarded setting times, higher flow rates, and dramatic improvements in compressive strength and flexual strength over the control sample. Sample 2 also exhibited an improved tensile strength compared with the control sample.

Sample 3 was prepared according to the fourth exemplary embodiment of the invention which lacks the styrene butadiene latex. Sample 4 was prepared according to the fifth exemplary embodiment of the invention, which lacks the melamine-formaldehyde sodium bisulfite polymer. Samples 3 and 4 exhibited longer setting times and improved compressive and flexual strength compared with the control sample. Sample 3(i) was prepared in a similar manner to sample 3, except the gypsum was not soaked in water for

TABLE I

| | Ingredients | | | | | | Setting | Strength (psi) | | |
|---|---|---|---|---|---|---|---|---|---|---|
| Sample | Acrylic Latex | Aliphatic Alcohol | Styrene Butadiene Latex | Melamine-Formaldehyde Polymer | Water Gypsum | Flow (mm) | Time (min) | Compressive | Tensile | Flexual |
| Control A[1] | 0 | 0 | 0 | 0 | 0.70 | 93.5 | 16 | 1,623 | 311 | 625 |
| 1 | 0.41 | 0.144 | 1.6 | 1.0 | 0.55 | 220 | 60 | 2,880 | 263 | 747 |
| 2 | 1.0 | 0.144 | 5.3 | 1.0 | 0.55 | 240 | 90 | 2,303 | 374 | 814 |
| 2(i) | 1.0[2] | 0.144 | 5.3 | 1.0 | 0.55 | 243 | 30 | 2,974 | 315 | 799 |
| 3 | 0.41 | 0.144 | 0 | 1.0 | 0.55 | 226 | 50 | 2,789 | 209 | 667.5 |
| 3(s)[3] | 0.41 | 0.144 | 1.6 | 0 | 0.70 | 207 | 60 | 1,990 | 240 | 740 |
| 4 | 0.41 | 0.144 | 1.6 | 0 | 0.70 | 207 | 60 | 1,436 | 226 | 684 |
| 5 | 0.41 | 0.144 | 0 | 0 | 0.70 | 254 | 45 | 1,735 | 281 | 620 |
| 5(i) | 1.0 | 0.144 | 0 | 0 | 0.70 | 255 | 85 | 1,757 | 278 | 750 |
| 6 | 0.41 | 0.144[4] | 1.6 | 0 | 0.70 | 232 | 62 | 1,351 | 198 | 704 |
| 7C | 0.41 | 0 | 0 | 0 | 0.70 | 234 | 42 | 1,314 | 144 | 572 |
| Control B[5] | 0 | 0 | 0 | 0 | 0.32 | 280 | 25 | 10,342 | 313 | 1,326 |
| 8 | 1.5 | 0.144 | 5.3 | 1.0 | 0.27 | 300 | 50 | 7,150 | 746 | 1,663 |

[1]Control sample A and samples 1, 2, 2(i), 3, 3(s), 4–5, 5(i) and 6 comprise "No. 1 POTTERY PLASTER" gypsum.
[2]Sample 2(i) is similar to sample 2 except that sample 2(i) contains the acrylic latex "SYNTHEMUL 40423" from the Reichhold Co.
[3]Sample 3(s) was prepared in the same manner as sample 3 except the gypsum was not soaked in water for the usual 2–3 minute period before mixing with the other ingredients.
[4]The aliphatic alcohol used for this sample was isopropyl alcohol.
[5]Control sample B and sample 8 comprise "HYDROSTONE" gypsum.

Samples 1–6 are representative embodiments of the invention. The samples labeled "Control A" and "Control B" were prepared without any additives. "No. 1 POTTERY PLASTER" gypsum from U.S. Gypsum Co. supplied by BQE Building Supply Incorporated, was used in Control A and samples 1, 2, 2(i), 3, 3(s), 4–5, 5(i) and 6. "HYDROSTONE" gypsum was used in Control B and in sample 8. The specific type of acrylic latex used for all the samples in Table I except 2(i) was "DRYCRYL DP-2903." The aliphatic alcohol used in samples 1–5 was "FOAMASTER A." The styrene butadiene polymer used was "RHOPLEX E-330" from the Rohm & Haas corporation. The melamine-formaldehyde polymer used was a polymeric melamine-formaldehyde sodium bisulfite sold under the name "MELMENT F-10" by the SKW Chemicals Inc.

Each sample was characterized to determine its setting time, flow and mechanical strength. The flow of the gypsum composition was measured for each sample using a test two or three minutes before adding the additives and stirring, as in the remainder of the samples.

Samples 5 and 5(i) were prepared according to the second exemplary embodiment of the invention having an acrylic latex and a polyether derivative of an aliphatic alcohol. Samples 5 and 5(i) exhibited improved flow and a retarded setting time compared to the control sample. Samples 5 and 5(i) also exhibited better compressive strength than the control sample.

Sample 6 was prepared in the same manner as sample 4, except the polyether derivative of an aliphatic alcohol used in sample 4 was replaced with isopropyl alcohol in sample 6. Sample 6 exhibited retarded setting times and better flow compared with the control sample.

Sample 7C was prepared for comparison purposes with sample 5. Sample 7C lacked the aliphatic alcohol used in sample 5. Sample 7C exhibited improved flow and setting time compared with the control sample. However, sample 7C exhibited far poorer mechanical properties compared with sample 5. Therefore an aliphatic alcohol is a necessary ingredient of the claimed composition.

Sample 8 was prepared according to the seventh exemplary embodiment of the invention using "HYDROSTONE" gypsum, which is stronger than "No. 1 POTTERY PLASTER" gypsum. A comparison of sample 8 with control sample B shows that sample 8 exhibits a retarded setting time and increased tensile and flexual strength compared with control sample B.

EXAMPLE 2

Comparative Examples

Table II shows a comparison of an exemplary embodiment of the invention (sample 2) with gypsum compositions containing a commercially available gypsum composition setting time retarding agent (samples 9C–11C) and a composition described in Example 1 of U.S.S.R. Published Patent Application No. 783,276 (sample 12C). The commercially available gypsum composition setting time retarding agent, "RED TOP" retarder, is sold by USG Corporation through BQE Building Supply Inc., which is located at 858 Meeker Ave. in Brooklyn, N.Y. 11222. Table II also presents a comparison of a preferred embodiment of the invention (sample 2) with a composition having 10% of a styrene butadiene latex sold by Reichhold Co. under the tradename "SYNTHEMUL 96-023" (sample 13C). Table II is shown below:

(1) 1500 grams of "No. 1 POTTERY PLASTER" gypsum, (2) 6.2 grams of an acrylic latex "DRYCRYL DP-2903", (3) 2.16 grams of an aliphatic alcohol "FOAMASTER A", (4) 40.6 grams of a styrene butadiene latex "RHOPLEX E 330", (5) 15 grams of a melamine-formaldehyde sodium bisulfate polymer "MELMENT F10", (6) 1 gram of "JET BLACK" pigment, and (7) 730 grams of water.

This composition was mixed for less than minutes, poured into a mold, and allowed to set. Upon demolding, the product exhibited a flat surface. The composition hardened to a flat surface strongly resembling marble which did not require polishing.

Although the present invention has been described in detail with reference to certain preferred versions thereof, other versions are possible. Therefore, the spirit and scope of the appended claims should not be limited to the description of the preferred versions contained herein.

We claim:

1. A plaster composition which comprises:
   (a) calcium sulfate hemihydrate,
   (b) an acrylic latex,
   (c) an alcohol selected from the group consisting of aliphatic alcohols and defoaming agents, and
   (d) a melamine-formaldehyde polymer, wherein ingredients (b), (c) and (d) are present in amounts which are sufficient to: (1) retard the set time and increase the

TABLE II

| Sample | Ingredients | | | | | Water Gypsum | Flow (mm) | Setting Time (min) | Strength | | |
|---|---|---|---|---|---|---|---|---|---|---|---|
| | Acrylic Latex | Aliphatic Alcohol | Styrene Butadiene Latex | Melamine Polymer | Other Additives | | | | Compressive | Tensile | Flexual |
| Control | 0 | 0 | 0 | 0 | 0 | 0.70 | 93.5 | 16 | 1,623 | 311 | 625 |
| 2 | 1.0 | 0.144 | 5.3 | 1.0 | 0 | 0.55 | 240 | 90 | 2,303 | 374 | 814 |
| 9C | 0 | 0 | 0 | 0 | 0.6 USG Red Top | 0.70 | 247 | 50 | 1,921 | 257 | 671 |
| 10C | 0 | 0 | 0 | 1.0 | 0.6 USG Red Top | 0.55 | 226 | 90 | 1,553 | 280 | 488 |
| 11C | 0 | 0 | 0 | 0 | 1.2 USG Red Top | 0.70 | 287 | 70 | 1,195 | 180 | 529 |
| 12C[1] | — | — | — | — | See footnote 1 | 0.70 | 262 | 80 | 1,309 | 183 | 494 |
| 13C[2] | — | — | 10.0[2] | — | | 0.70 | 76 | 300 | 952 | 244 | 508 |

[1]Sample 12C was prepared according to Example 1 of U.S.S.R. Patent Publication No. 783,276, which contains plaster (100 parts by weight), a latex (3 parts by weight) consisting of a copolymer of butadiene (74% by weight) and acrylonitrite (26% by weight) stabilized with a non-ionogenic emulsifier, a formaldehyde-containing oligomer (1.5 parts by weight), a 20% aqueous solution of potassium alum (0.2 parts by weight), water (55 parts by weight), and a ceramic pigment (1 part by weight).
[2]Sample 13C was prepared according to U.S.S.R. Patent Publication No. 783,276, formula No. 1. It contains 10% by weight of gypsum of the styrene butadiene latex "SYNTHEMUL 96-023" sold by the Reichhold Company.

Table II shows that sample 2 according to the invention retards the setting time and imparts greater compressive, tensile and flexual strength to the set composition than does any of comparative Examples 9C–13C.

EXAMPLE 3

Artificial Marble

An artificial marble composition was prepared according to the eighth exemplary embodiment of the present invention. The artificial marble composition contained the following ingredients:

flow of a wet plaster composition formed upon adding water to the plaster composition, and (2) increase the strength of a set gypsum composition formed upon hardening after adding water to the plaster composition.

2. The plaster composition according to claim 1, wherein the composition further comprises a pigment.

3. The plaster composition according to claim 1, which further comprises a styrene butadiene latex.

4. The plaster composition according to claim 1, wherein the composition comprises from 0.25 to 4% of the acrylic latex by weight, based on the weight of the calcium sulfate hemihydrate.

5. The plaster composition according to claim 1, wherein the composition comprises from 0.1 to 1% of the alcohol by weight, based on the weight of the calcium sulfate hemihydrate.

6. The plaster composition according to claim 1, wherein the composition comprises from 0.25 to 4% of the acrylic latex by weight, based on the weight of the calcium sulfate hemihydrate, and from 0.1 to. 1% of the alcohol by weight, based on the weight of the calcium sulfate hemihydrate.

7. The plaster composition according to claim 6, wherein the composition further comprises a pigment.

8. The plaster composition according to claim 6, wherein the alcohol is isopropyl alcohol.

9. The plaster composition according to claim 6, wherein the alcohol is a defoaming agent.

10. The plaster composition according to claim 9, wherein the defoaming agent is a polyether derivative of an aliphatic alcohol.

11. The plaster composition according to claim 9, which further comprises a pigment.

12. The plaster composition according to claim 6, wherein the composition further comprises from 1.6 to 8% of a styrene butadiene latex by weight, based on the weight of the calcium sulfate hemihydrate.

13. The plaster composition according to claim 6 wherein the composition comprises from 0.5 to 2% of a melamine-formaldehyde polymer by weight, based on the weight of the calcium sulfate hemihydrate.

14. The plaster composition according to claim 12, wherein the composition comprises from 0.5 to 2% of a melamine-formaldehyde polymer by weight, based on the weight of the calcium sulfate hemihydrate.

15. The plaster composition according to claim 14, which further comprises a pigment.

16. A set gypsum composition which comprises a set reaction product of a wet plaster composition comprising:
    (a) calcium sulfate hemihydrate,
    (b) an acrylic latex,
    (c) an alcohol selected from the group consisting of aliphatic alcohols and defoaming agents,
    (d) a melamine-formaldehyde polymer, and
    (e) an amount of water at least sufficient to convert the calcium sulfate hemihydrate to calcium sulfate dihydrate, wherein ingredients (b), (c) and (d) are present in amounts which are sufficient to: (1) retard the set time and increase the flow of the wet plaster composition, and (2) increase the strength of the set gypsum composition formed upon hardening of the wet plaster composition.

17. A wet plaster composition comprising:
    (a) calcium sulfate hemihydrate,
    (b) an acrylic latex,
    (c) an alcohol selected from the group consisting of aliphatic alcohols and defoaming agents,
    (d) a melamine-formaldehyde polymer, and
    (e) an amount of water sufficient to convert the calcium sulfate hemihydrate to calcium sulfate dihydrate, wherein ingredients (b), (c) and (d) are present in amounts which are sufficient to: (1) retard the set time and increase the flow of the wet plaster composition, and (2) increase the strength of a set gypsum composition formed upon hardening of the wet plaster composition.

18. The set gypsum composition according to claim 16, which further comprises a pigment.

* * * * *

UNITED STATES PATENT AND TRADEMARK OFFICE
CERTIFICATE OF CORRECTION

PATENT NO. : 5,725,656

DATED : March 10, 1998

INVENTOR(S) : Semyon Shimanovich et al.

It is certified that error appears in the above-identified patent and that said Letters Patent is hereby corrected as shown below:

Col. 6, line 12, "than minutes" should read -- than 5 minutes --.

Signed and Sealed this

Eleventh Day of May, 1999

Attest:

Q. TODD DICKINSON

*Attesting Officer*    *Acting Commissioner of Patents and Trademarks*